Figure 1:
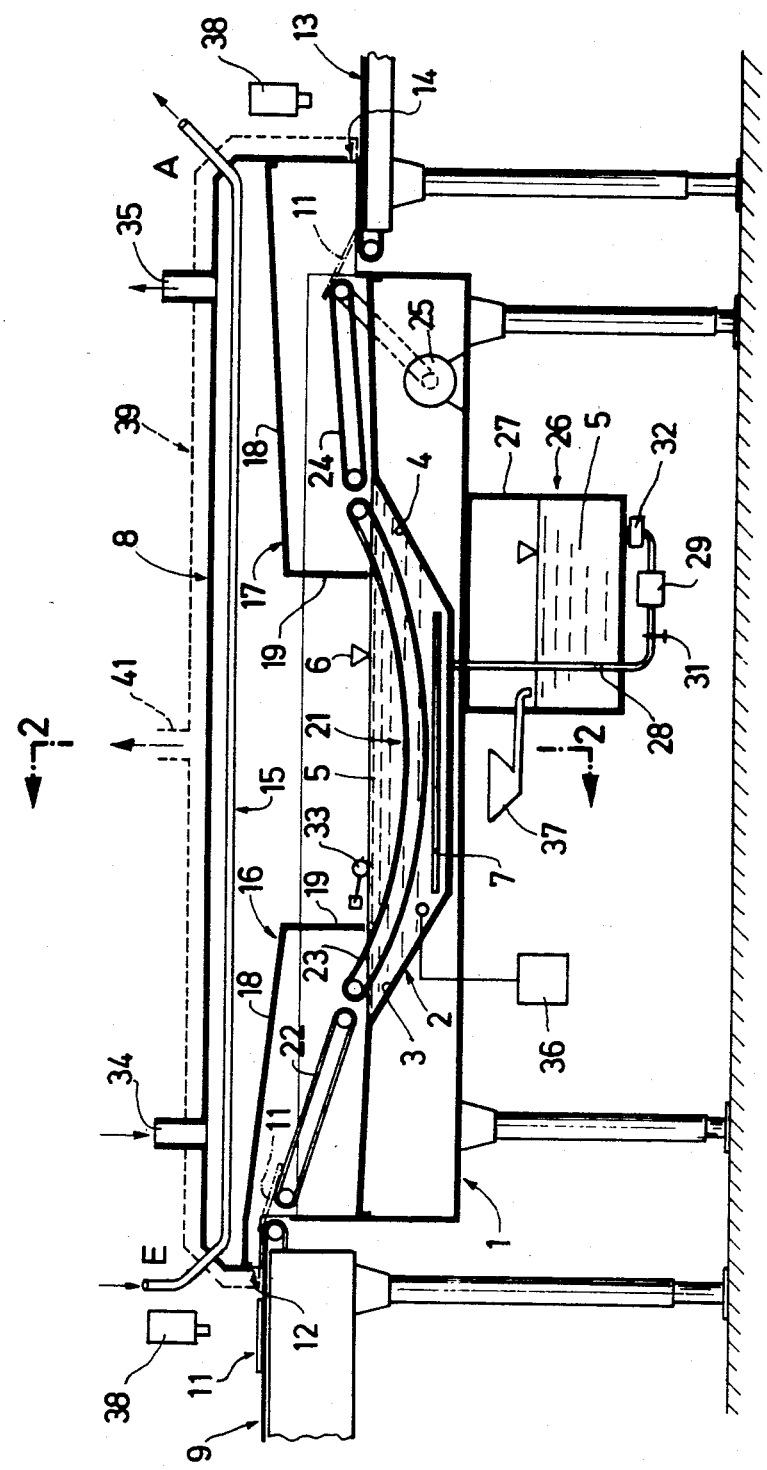

United States Patent [19]

Wartenberg

[11] Patent Number: 4,512,282
[45] Date of Patent: Apr. 23, 1985

[54] APPARATUS FOR COATING PLATE-SHAPED BODIES OF GLAZED CERAMIC (TILES), GLASS OR ENAMEL

[76] Inventor: Erwin W. Wartenberg, Brunnenwiesen 6, 7000 Stuttgart 71, Fed. Rep. of Germany

[21] Appl. No.: 547,759

[22] Filed: Nov. 1, 1983

[30] Foreign Application Priority Data

Nov. 13, 1982 [DE] Fed. Rep. of Germany ....... 3242166

[51] Int. Cl.³ .............................................. B05C 3/10
[52] U.S. Cl. .................................... 118/666; 118/689; 118/64; 118/50; 118/69; 118/423; 118/429
[58] Field of Search ...................... 118/64, 50, 61, 423, 118/429, 689, 712, 666, 690, 69

[56] References Cited

U.S. PATENT DOCUMENTS

| | | | |
|---|---|---|---|
| 2,281,724 | 5/1942 | Snyder | 118/64 |
| 2,321,397 | 6/1943 | Koch | 118/423 |
| 2,555,673 | 6/1951 | Beatty | 118/423 X |

*Primary Examiner*—John P. McIntosh
*Attorney, Agent, or Firm*—Leydig, Voit, Osann, Mayer & Holt, Ltd.

[57] ABSTRACT

Apparatus for applying a thin, adhesive coating to plate-shaped bodies of glazed ceramic, e.g., tiles, glass or enamel. To this end, there are provided: a heated tank for receiving the dipping liquid; a cover hood shielding the tank and the liquid bath from the environment and comprising inlet and outlet slits for the plate-shaped bodies; a cooling device arranged in the cover hood; a conveyor mechanism extending from the inlet to the outlet slit on a downwardly curved path through the tank and a mechanism for adjustment of the length of the dipping section to lower and raise the liquid level in the tank.

9 Claims, 2 Drawing Figures

APPARATUS FOR COATING PLATE-SHAPED BODIES OF GLAZED CERAMIC (TILES), GLASS OR ENAMEL

DESCRIPTION

The invention relates to an apparatus for applying a thin, adhesive coating to plate-shaped bodies of glazed ceramic (tiles), glass or enamel by dipping the bodies into a liquid bath in which a substance constituting the coating is dissolved.

It is known (German Patent No. 2,108,849) to apply a thin, colored lustre coating to bodies of glazed ceramic, glass or enamel by first coating the surface of the body with a thin layer of at least one metal existing in several valencies and oxides of this metal and then producing lasting lustre colors in this coating by a heat treatment. To produce the metal/metal oxide coating, the body is heated to a temperature of, for example, approximately 500° C. and subsequently dipped into a heated liquid containing pyrolytically easily decomposable metallic compounds, e.g., iron pentacarbonyl in alcoholic solution. Around the dipped-in body there forms in the liquid bath on account of the Leidenfrost phenomenon a gas envelope which contains both solvent molecules and the molecules of the metallic compound. The molecules of the metallic compound decompose pyrolytically on the heated body surface, partially including the solvent molecules as reactants, and form on the surface a uniform, thin layer of a mixture of metal and metal oxide phases of alternating composition. The layer thickness lies in the order or magnitude of the wavelength of light.

Attempts were made to develop an apparatus for automatically performing the dipping-in and coating of the bodies so as to thus enable performance of the aforementioned process for producing lustre coatings on an industrial scale. Numerous difficulties arose. The combustible vapors developing from the liquid bath had to be brought under control, condensate developing from the vapors had to be kept away from the surfaces of the bodies to be coated, and, for the manufacture of bodies with reproducible lustre colors, the dwell time of the bodies in the dipping bath had to be precisely controlled since the layer thickness, which partially determines the shade of the lustre color, is dependent on the coating and consequently the dipping duration.

The object underlying the invention is to provide a safely and precisely operating, commercially usable apparatus for applying a thin coating to plate-shaped bodies by dipping the bodies into a liquid bath, with the dipping time being precisely adjustable. In particular, such an apparatus should be suitable for producing lustre coatings on bodies of glazed ceramic (tiles), glass or enamel.

The object is attained in accordance with the invention by the following features:

(a) a heated tank for receiving the dipping liquid;
(b) a cover hood shielding the tank and the liquid bath from the environment and comprising inlet and outlet slits for the plate-shaped bodies;
(c) a cooling device arranged in the cover hood;
(d) a conveyor mechanism extending from the inlet to the outlet slit on a downwardly curved path through the tank;
(e) a mechanism for adjustment of the dipping section to lower and raise the liquid level in the tank.

The following description of a preferred embodiment of the invention serves in conjunction with the attached drawings to explain the invention in further detail.

Figure 2:
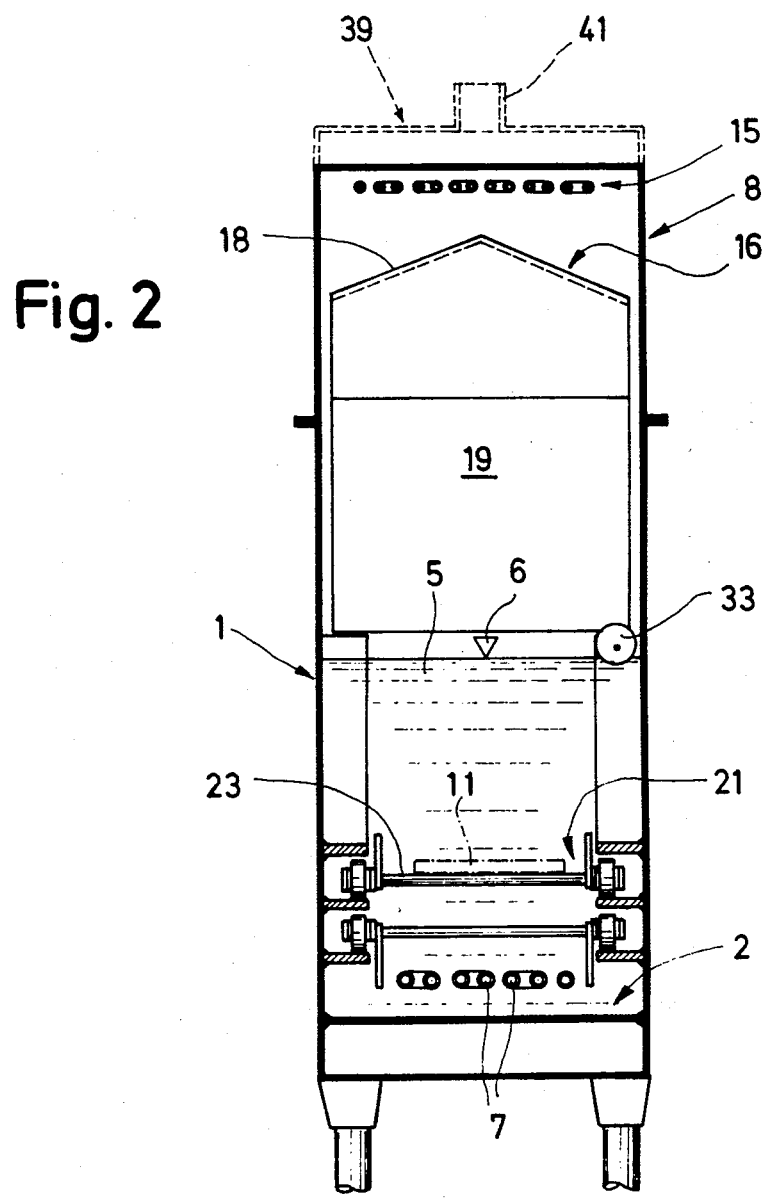

FIG. 1 is a schematic side view of an apparatus for coating plate-shaped bodies and FIG. 2 is a sectional view along line 2—2 in FIG. 1.

A tank 1 provided with a metal casing comprises a trough-shaped recess 2 with inclined surfaces 3 and 4 at the inlet and outlet sides. In the recess 2 there is a dipping liquid 5 whose height or level is indicated by a small triangle 6. The tank 1 is heatable by a heating mechanism, for example, heating bars 7, so that the liquid 5 can be kept at a predetermined temperature, e.g., in the proximity of its boiling point. A thermostat (not illustrated) keeps the temperature constant. The tank 1 and the liquid bath contained therein are shielded from the environment by a cover hood 8 placed thereon so that vapors originating from the liquid bath cannot diffuse. As illustrated, the cover hood 8 protrudes at the inlet and outlet sides E and A of the apparatus beyond the tank 1. At the inlet side E a conveyor mechanism 9 is provided, e.g., a conveyor belt, which extends to beneath the hood 8 protruding there. Between the hood 8 and the upper side of the conveyor mechanism 9 there is a narrow, horizontally extending inlet slit 12 through which a body submerging into the liquid bath, namely a tile 11 glazed on its upper side, can be introduced into the apparatus. At the outlet side A of the apparatus, the cover hood 8 extends over a further conveyor mechanism 13, and between this conveyor mechanism and the hood 8 there is a narrow, horizontally extending outlet slit 14 through which the tiles 11, provided with a thin coating in the dipping bath, can leave the apparatus. At the slits 12, 14, flexible closure members can be provided which bend accordingly when the tile 11 enters and exits, and which substantially close the slits in the absence of tiles.

Inside the cover hood there is a cooling mechanism 15, for example, in the form of a tube coil to condense gases which have evaporated from the liquid bath. At the inlet side E, cooled water can be fed into the cooling mechanism 15 in the form of a tube coil, heated as it passes through the hood 8 and exit at the outlet side A.

Beneath the cooling mechanism 15 in the cover hood 8 there are located condensate shields 16, 17 having the shape apparent from FIGS. 1 and 2. According to the longitudinal sectional view shown in FIG. 1, the shields 16, 17 each comprise one leg 18 extending obliquely downwardly from the inlet or outlet side of the cover hood 8, respectively, to beyond the inclined surfaces 3, 4 and adjoined by a vertically oriented leg 19 reaching just to the upper edge of the trough 2. The shield mechanisms 16, 17 consist of sheet metal and extend substantially over the entire width of the apparatus. According to the transverse sectional view shown in FIG. 2, the legs 18 commencing at the inlet or outlet side of the apparatus, respectively, are bent in roof-shaped configuration so that condensate dripping off from the cooling mechanism 15 can flow off laterally and in the direction of the trough 2.

Inside the tank 1, there extends from the inlet to the outlet side a conveyor mechanism 21, for example, in the form of a chain conveyor or a roll conveyor (FIG. 2 bottom) which is provided with transverse bars and receives the tiles 11 to be transported. In the area of the trough 2 containing the liquid bath, the conveyor mechanism 21 extends on a downwardly curved path. The conveyor mechanism 21 comprises a total of three successively arranged conveyor sections 22, 23 and 24, with conveyor section 22 covering substantially the distance between inlet slit 12 and liquid surface 6, conveyor section 23 extending substantially exclusively in the trough 2 containing the liquid, and conveyor section 24 covering substantially the area between the liquid surface 6 and the outlet slit 14. The individual transportation belts of the conveyor sections 22, 23 and 24 can be coupled to one another with respect to drive and be driven via a common drive motor 25. The transportation speed of the conveyor mechanism is changeable within certain limits, e.g., by appropriate design of the motor 25.

The shield 16 covers substantially the conveyor section 22 and prevents the dripping of condensate onto tiles located on this conveyor section. In a corresponding manner, the shield 17 covers the conveyor section 24. As shown in FIG. 1, the legs 18 of the shields 16, 17 extend so far inwardly that they also shield off the ends of the conveyor section 23 protruding out of the liquid bath in FIG. 1. The tiles 11 to be coated in the dipping bath are transported successively from the conveyor mechanism 9 to the conveyor sections 22, 23 and 24 and subsequently to the conveyor mechanism 13. In section 23, the dipping into the liquid bath occurs.

It has been found that there is a certain optimum speed at which the tiles should pass through the dipping bath in order to obtain a uniform coating. However, in order to render adjustable the dwell time of the tiles in the dipping bath, which, as is known, determines the thickness of the coating applied, there is provided in accordance with the invention a mechanism 26 with the aid of which the liquid level 6 in the tank 1 may be lowered or raised. This enables the length of the dipping section in the liquid bath to be adjusted and thereby the dwell time of the tiles in the liquid 5 to be adjusted accordingly. The lower the liquid level, the shorter is the dipping section owing to the curvature of the path of the conveyor section 23.

The mechanism 26 comprises a container 27 arranged beneath the tank 1 and containing a supply of dipping liquid 5. The container 27 may also comprise heating bars corresponding to the heating bars 7. A line 28 leads from the bottom of the container 27 to the bottom of the trough 2. The line 28 comprises a pump 29 and a remote-controlled valve 31. If the level 6 of the liquid 5 in the trough 2 is to be lowered, the valve 31 is opened so that the liquid 5 can flow out of the trough 2 back into the container 27. If, in the reverse case, the liquid level 6 in the tank 1 is to be raised, the pump 29 is put into operation with the valve 31 open. The line 28 further comprises a filter 32 for precipitated iron oxides.

With the aid of the mechanism 26, dipping times of between approximately 2 and 20 seconds in the tank 1 are adjustable.

It has been found that the tiles 11 must be conveyed through the apparatus at a certain minimum speed so as to pass quickly through the gas area in front of and behind the liquid bath. If the transportation speed is too slow, unavoidable vapor residues can condense on the tiles, which results in an uneven coating. On the other hand, a maximum transportation speed of the tiles 11 may not be exceeded, otherwise the tiles upon entering the liquid 5 float in it and rise up from the conveyor mechanism 21.

The division of the conveyor mechanism 21 into the three conveyor sections 22, 23 and 24 has the further advantage that no heat and liquid can be exchanged between the conveyor sections 22 and 24, on the one hand, and the conveyor section 23. Accordingly, the conveyor sections 22, 24 always remain substantially dry and the heat loss in section 23 is kept to a minimum. This arrangement effectively prevents the liquid from being carried out to the inlet and outlet slits 12 and 14, respectively.

Associated with the dipping bath in the tank 1 is preferably a liquid level indicator 33 (indicated only schematically in FIG. 1) e.g. in the form of a float. The liquid level indicator can be used for remote control of the pump 29 and the valve 31 so as to thus keep a certain liquid level in the dipping bath constant.

In certain embodiments of the invention, it may be advantageous to maintain a protective gas atmosphere in the cover hood 8 and above the dipping bath. To this end, the cover hood 8 comprises inlet and outlet openings 34 and 35 for such a protective gas, for example, nitrogen.

To obtain uniformly thick coatings on the tiles 11, it is important to keep the concentration of the coating substance in the liquid 5 constant. To measure and indicate this concentration, there is provided an infrared spectrometric measuring device 36, known per se, whose sensor is located inside the liquid bath. A dosing mechanism 37 (indicated only schematically in FIG. 1) which enables coating substance, for example, in concentrated liquid solution, to be replenished, is provided on the supply container 27. To this end, the measuring device 36 is connected to the dosing mechanism 37 so that the concentration is replenished and kept constant automatically.

At the inlet and outlet sides E and A of the apparatus there are arranged infrared sensors 38 with which the temperature of the tiles 11 entering and exiting is controlled.

Finally, as indicated in dash lines in FIG. 1, the cover hood 8 may be of double-walled design. The area enclosed by the double wall is closed throughout and comprises solely in the area of the inlet and outlet slits 12 and 14 openings which serve as suction removal places for vapors or gases exiting at the slits 12, 14. The area enclosed by the double wall is connected to a suction source, e.g., a suction pump, via a connection pipe 41. In this way, harmful and dangerous gases or vapors are prevented from escaping from the apparatus into the environment.

In the manufacture of colored lustre coatings, the tank 1 may contain as dipping bath a boiling, one percent solution of iron pentacarbonyl in butanol. The tiles 11 are heated to a temperature of, for example, 500° C. before entering the apparatus.

I claim:

1. Apparatus for applying a thin, adhesive coating to plate-shaped bodies of glazed ceramic (tiles), glass or enamel by dipping the bodies into a liquid bath in which a substance constituting the coating is dissolved, comprising the following features:

(a) a heated tank for receiving the dipping substance;
(b) a cover hood shielding the tank and the liquid bath from the environment and comprising inlet and outlet slits for the plate-shaped bodies;
(c) a cooling device arranged in the cover hood;
(d) a conveyor mechanism extending from the inlet to the outlet slit through the tank and running at a constant transportation speed, said conveyor mechanism comprising three successively arranged conveyor sections, with the first covering substantially the area between the inlet slit and the liquid surface, the second extending substantially exclusively in the tank on a downwardly curved path, and the third covering substantially the area between the liquid surface and the outlet slit;

(e) a pumping mechanism for adjustment of the dipping time by lowering and raising the liquid level in the tank.

2. Apparatus according to claim 1, having a condensate shield in the cover hood.

3. Apparatus according to claim 1, wherein said conveyor mechanism has a transportation speed that is changeable within certain limits.

4. Apparatus according to claim 1, wherein said cover hood is of double-walled design with suction removal places located at the inlet and outlet slits, and is connected to a suction source.

5. Apparatus according to claim 1, wherein said pumping mechanism comprises the following elements: a supply container for the dipping liquid, a pump for transporting the dipping liquid from the supply container to the tank, and a valve for letting off the liquid from the tank into the supply container.

6. Apparatus according to claim 5, having a liquid level indicator with remote control of said pump and/or said valve.

7. Apparatus according to claim 1, comprising an infrared spectrometric measuring device for measuring and indicating the concentration of the coating substance in the dipping bath and a dosing mechanism actuated by the measuring device for replenishing the coating substance.

8. Apparatus according to claim 1, comprising infrared sensors for temperature measurement of the bodies as they enter and exit, said sensors being arranged at the inlet and outlet slits.

9. Apparatus according to claim 1, wherein the cover hood comprises inlet and outlet openings for a protective gas.

* * * * *